United States Patent [19]

Lemieux et al.

[11] Patent Number: 5,392,914
[45] Date of Patent: Feb. 28, 1995

[54] REFILL PACK FOR PIPETTE TIP RACKS

[75] Inventors: David J. Lemieux, Middleton, Mass.; Paul K. Chadwick, San Francisco, Calif.; Christopher Kelly, Larkspur, Calif.; James S. Petrek, Danville, Calif.; Kenneth Rainin, Piedmont, Calif.; Haakon T. Magnussen, Jr., Orinda, Calif.; William D. Homberg, Oakland, Calif.

[73] Assignee: Rainin Instrument Co., Inc., Emeryville, Calif.

[21] Appl. No.: 124,966

[22] Filed: Sep. 21, 1993

[51] Int. Cl.6 ............ B65D 85/30; B65D 21/00; B01L 3/02
[52] U.S. Cl. ............ 206/499; 206/486; 206/562; 422/100; 422/104
[58] Field of Search ............ 206/486, 499, 562, 510; 422/100, 104

[56] References Cited

U.S. PATENT DOCUMENTS

| | | |
|---|---|---|
| 3,853,217 | 12/1974 | Scordato et al. |
| 3,937,322 | 2/1976 | Cohen. |
| 4,130,978 | 12/1978 | Cohen .................. 206/499 X |
| 4,349,109 | 9/1982 | Scordato et al. .......... 206/562 |
| 5,057,282 | 10/1991 | Linder ................. 206/562 X |
| 5,324,482 | 6/1994 | Scaramella et al. ........ 422/100 |

OTHER PUBLICATIONS

Bio-Rad Laboratories, Inc. Richmond, Calif.–Nested & enclosed racks.
U.S.A./Scientific Plastics, Ocala, Fla.–Re-Pack Rack & cartridge.

*Primary Examiner*—Bryon P. Gehman
*Attorney, Agent, or Firm*—Robert R. Meads

[57] ABSTRACT

A refill pack of light weight low mass material containing an array of replacement pipette tips for a reusable tip rack. The refill pack comprises a support plate with an array of holes containing pipette tips arranged in an organized manner and including a skirt-like guide for centering and guiding the support plate onto the tip rack with distal end portions of the pipette tips aligned with and vertically entering corresponding holes in an organizing tray in the tip rack.

22 Claims, 10 Drawing Sheets

REFILL PACK FOR PIPETTE TIP RACKS

FIELD OF INVENTION

The present invention relates to the refilling of pipette tip racks and, more particularly to environmentally protective disposable refill packs of pipette tips for reusable pipette tip racks.

BACKGROUND OF THE INVENTION

It is the function of pipette tip racks to organize disposable pipette tips in a manner for convenient tip placement on a pipette. Such racks generally comprise a rigid base with vertical sides joined at contiguous edges and horizontally supporting a rigid pipette tip organizing tray having an array of pipette tip receiving holes extending there through. The pipette tips are organized and held vertically in the array of holes for ease of access by a pipette tip user. In this regard, the pipette tip user simply places a hand-holdable pipette over the rack and lowers a distal end of the pipette into a proximal or upper end of a vertically oriented pipette tip and presses down to affix the tip to the pipette. A similar operation is followed by the user when connecting a plurality of tips to a multiple tip pipette. U.S. Pat. No. 4,676,377 describes a conventional pipette tip rack of the type just described, and U.S. Pat. No. 4,779,467 describes a multiple tip pipette.

Once all tips are dispensed from the tip rack, the rack may be discarded or reloaded with a new supply of pipette tips. The reloading of replacement pipette tips into the tip rack in a rapid, convenient manner is important to pipette users. In this regard, any packaging containing pipette tips for use in reloading pipette tips into a tip rack should arrange the pipette tips in a manner to accommodate direct dispensing of the tips into the array of holes in the organizing tray of tip rack. Further, the packaging should guide and assist in centering the replacement pipette tips over the rack with the array of replacement tips aligned with the array of holes in the pipette tip rack organizing tray upon a lowering of the packaging onto the rack. Moreover, it is important that such packaging protect the replacement pipette tips from damage and contamination during shipping, handling and storage and provide for sterilization of the replacement tips by autoclaving or irradiation. Still further, when plastic materials are utilized for such packaging, it is particularly important to the preservation of our environment that (1) the plastic material be recyclable to the extent possible and (2) the packaging structure be thin, lightweight and of low mass to minimize the amount of non-biodegradable disposable material from such packaging. Furthermore, there is a need for refill packs for manually reloading reusable pipette tip racks with filter containing pipette tips such as the FilterPro of the Rainin Instrument Co., Inc., assignee of the present invention, or, such as the filter devices described in U.S. Pat. No. 5,156,811, assigned to Continental Laboratory Products, Inc. of San Diego, Calif.

Prior packaging used for stacks of pipette tip racks and for replacement pipette tips for reloading empty pipette tip racks do not satisfy such requirements, particularly the guiding and centering of the replacement tips over the empty tip rack with the array of replacement tips aligned with the array of holes in the organizing tray of the rack. For example, U.S. Pat. No. 3,853,217 describes a stack of rigid stand-alone pipette tip racks, referred to in the patent as "trays". Each tray comprises a horizontally oriented rectangular support. The horizontal support contains transverse stiffening ribs. Each rib extends above the horizontal support and terminates in marginal vertical sides. The sides extend above and below the horizontal support and connect at their contiguous edges to form a skirt. The skirt extends below distal end portions of vertical pipette tips contained in a honeycomb array of openings in the horizontal surface. A shoulder is formed around the skirt so as to accept and support an identical upper tray to rest a lowermost edge of its skirt for stacking of the trays. The shoulder thereby spaces the next upper tray so as to allow the distal end portion of the pipette tips in the upper tray to extend into the open proximal end of the pipette tips in the lower tray. Concentric positioning of the upper tips in the lower tips permits a nested stacking of multiple trays. A cover encloses the topmost tray in the stack. Tape is used to secure the cover and stacked trays; applied to fasten the cover and trays along common sides. Nested stacks of the trays with a cover are enclosed within a snug carton for shipping and storage. Additionally, folded sleeves are included in the shipping carton for covering a tray removed from the stack. The carton is provided with a pipette tip extractor for collecting used tips in the shipping carton. The trays are structurally rigid and have sufficient material thickness to be self supporting. The rigid trays are stored as stacked and used individually.

In use, the stacked trays with the cover taped in place are removed from the shipping carton. Individual trays are removed from the bottom of the stack by severing the tape attaching the lowest tray, leaving the upper trays attached and enclosed until the next bottom tray is to be used. The pipette tips are accessed individually from the tray, since the honeycomb arrangement does not accommodate multiple pipettes. Used pipette tips are disposed of in the shipping carton, using the tip extractor included. As each tray is emptied, it is discarded. Since the trays are intended for stand-alone use, their structure is necessarily heavy, with thick stiffening sections, containing a significant amount of plastic. Therefore, the heavy trays represent a significant environmental disposal problem. Also, the packaging described in the '217 patent is not useful in the reloading of an empty tip rack by guiding or centering an array of replacement pipette tips over and into an aligned array of holes in an organizing tray of the empty rack. Further, the nesting of the trays with upper pipette tips extending into lower tips, precludes the use of the package of U.S. Pat. No. 3,853,217 for storage and dispensing of filter containing pipette tips.

In U.S. Pat. No. 3,937,322, a package containing a stack of trays of pipette tips is disclosed. Each tray comprises a horizontal rectangular support with an array of openings. The openings accept distal end portions of pipette tips and maintain their longitudinal axes in a vertical orientation. The trays are stacked in a carton by telescoping the pipette tips carried by an upper tray into the open upper ends of the pipette tips carried by the next lower tray and by resting a lower surface of an upper tray on the upper edge of the proximal end portions of the pipette tips in a lower tray. The lowermost tray in the stack is supported on a tray support extending vertically from a bottom of the carton. Also, attached to the carton is a pipette tip extractor.

In use, the carton is opened at the top and uppermost pipette tip trays are exposed. The pipette tips are accessed from the open top of the carton and individually loaded onto pipettes. This is accomplished by vertically lowering a pipette into the carton, pressing an end of a pipette into a tip to seat the tip thereon and then by lifting the loaded pipette from the carton. When all the pipette tips on the uppermost tray have been thus dispensed from the tray, the tray is discarded, exposing the tips in the tray below. The pipette tip extractor is installed in the wall of the carton and permits a used tip to be extracted from the pipette and dropped into the carton without contact with the user. The carton is then used for disposal of used tips.

As described, the container of the '322 patent is characterized by a number of shortcomings. Because of the telescoping of the pipette tips in the stack of trays, it is not possible to use the packaging of the '322 patent for the storage and dispensing of filter containing pipette tips. Further, for one of the contained pipette tips to be accessible to a user for reloading of a pipette, substantially all the contained pipette tips are exposed to the atmosphere and hence subject to possible contamination. Finally, each tray is supported on the tops of the pipette tips in the next lower tray. Unless the trays and the bottom tray support are formed of a relatively heavy, rigid plastic or equivalent material, the downward pressing of the pipettes in the loading of tips will produce an undesired downward bowing of the trays. The bowing of the tray makes it difficult to insert a pipette onto the end of a pipette shaft. In the case of a multiple-tip pipette, only a small amount of bowing is required to prevent a user from being able to insert pipette tips simultaneously onto all shafts of the multiple-tip pipette simply by pressing down on the pipette. Rather, if the tray bows, a user must (i) check each tip individually in order to assure that each tip is properly secured to each pipette shaft and (ii) secure any loose tips individually by hand. With a heavier, more rigid rack support, such bowing will not occur. However, if the trays and the bottom tray support are formed of a heavy rigid plastic or equivalent material to prevent such undesired bowing of the trays during the loading of pipettes, then the disposal of such trays will present an undesired increase in the disposal of non-biodegradable materials. Further, the packaging described in the '322 patent is not useful in the reloading of an empty tip rack by guiding or centering an array of replacement pipette tips over and into an aligned array of holes in an organizing tray of the empty rack.

Prior commercially available packaging of stacks of pipette tip racks similar to the packaging disclosed by the U.S. Pat. No. 3,853,217 and possessing all the disadvantages thereof is represented by the RBR packaging of Bio-Rad Laboratories, Inc. of Richmond, Calif. TBR Packaging comprising a stack of separate stand alone racks is also available from Bio-Rad Laboratories, Inc. In addition, USA/Scientific Plastics of Ocala, Fla. markets a RE-PACK RACK comprising a reusable pipette tip rack designed to accept RE-PACK Tray Cartridges preloaded with 192 pipette tips per tray. Once a tray is empty, it is simply removed from the rack and discarded and another tray of cartridges inserted in its place. The RE-PACK Tray Cartridges are formed of a rigid, relatively heavy plastic construction and, but for the transverse ribs, resemble and possess the disadvantages of the trays disclosed in the U.S. Pat. No. 3,853,217. Such RE-PACK tray cartridges are available in shrink-wrapped stacks of 5 trays of 192 tips each. From the foregoing, it should be appreciated that prior packages for pipette tip racks and trays do not satisfy the previously stated desired requirements for packaging for reloading of disposable pipette tips into reusable tip racks. Thus, there is a continuing need for such packaging which is satisfied by this present invention.

SUMMARY OF THE INVENTION

In its most basic form, the present invention provides a simple., low cost and disposable or recyclable refill pack for reusable pipette tip racks in which pipette tips are contained with their longitudinal axes vertically positioned in a horizontally spaced pattern or array. The refill pack comprises a semi-rigid horizontal pipette tip organizing and support portion having an array of holes for vertically receiving and organizing pipette tips in a desired pattern for deposit into and containment within the organizing tray of an empty tip rack. Distal end portions of the pipette tips extend vertically through the holes on one side of the support portion while proximal end portions of the pipette tips are supported on an opposite side thereof. A hand-gripable refill pack positioning and guide structure of lightweight, low mass material extends from the support portion and comprises a guide extending downwardly from the support portion beyond the distal end portions of the pipette tips to provide protection therefor. The guide is open at its bottom and dimensioned to closely receive a top of the tip rack with inner sides of the guide engaging outer edges of the tip rack to center the refill pack over the tip rack and to guide the distal end portions of the pipette tips into the holes in the organizing tray of the tip rack for vertical support as the support portion carrying the pipette tips is lowered onto the tray to complete a refilling of the tip rack. Preferably the support portion of the refill pack comprises a separate support plate releasably secured to a light weight flexible hand-gripable positioning structure which when connected thereto guides and centers the support plate over and into an open top of an empty tip rack with distal end portions of the pipette tips carried by the support plate extending vertically into the array of holes in the organizing tray of the tip rack for support thereby upon a release of the positioning structure from the support plate.

Preferred embodiments are presented setting forth details referred to and illustrated in the drawings described below. The variations of the invention hereinafter described may be embodied as a single array refill pack or a multiple array refill pack and may include a pipette tip rack as well. Multiple array refill packs, according to the present invention, may comprise a stack of separate arrays of pipette tips or an array of stacks of pipette tips wherein tips at each level in each stack combine to form a array of pipette tips.

BRIEF DESCRIPTION OF THE DRAWINGS

FIG. 2b is a bottom view of the structure shown in FIG. 2a.

FIG. 10a shows the refill pack of FIG. 7. FIG. 10b shows the refill pack of FIG. 7 positioned on an empty tip rack. FIG. 10c shows the refill pack of FIG. 7 with a lowermost array of replacement tips being dispensed into the tip rack.

DESCRIPTION OF THE PREFERRED EMBODIMENTS

The present invention provides a novel refill pack of disposable pipette tips for reusable pipette tip racks and may take any of a multiplicity of forms within the claims hereafter presented.

Figure 11:
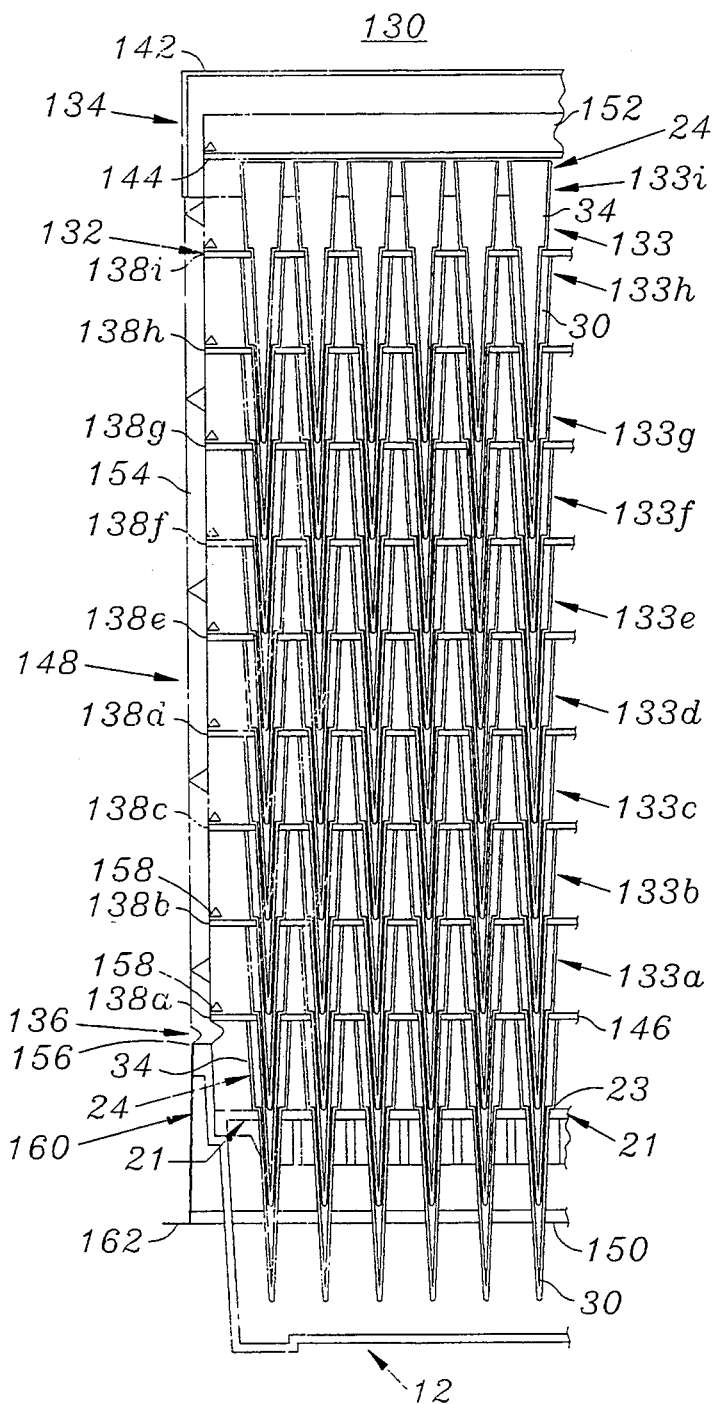
FIG. 11 is a partial side view of an alternate embodiment of a transparent plastic multiple array refill pack showing conventional pipette tips positioned in single array carrier plates stacked and contained in a multiple dispenser thin-wall shell and positioned on a fully loaded tip rack.
Figure 12:
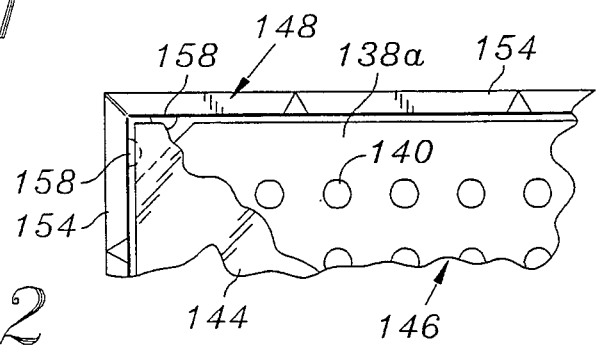
FIG. 12 is a top view partially cut away of a corner of a push plate and carrier plate in the embodiment of FIG. 11.

Generally, basic forms of single pipette array refill packs are shown in FIGS. 1a–c, 2a and b, 3, 4a–d 5 and 6. A first preferred embodiment of the refill pack for pipette tips in a nested multiple array is shown in FIGS. 7, 8, 9 and 10a–d, while a second preferred embodiment for pipette tips in a stacked multiple array refill pack is shown in FIGS. 11 and 12. Still another embodiment of a single array pipette tip refill pack is presented in FIGS. 13a–c. Each embodiment may include or exclude a tip rack as part of the refill pack. Additionally, the materials for use in the present invention may be selected as appropriate for sterilization by autoclaving or irradiation.

Figure 1A:
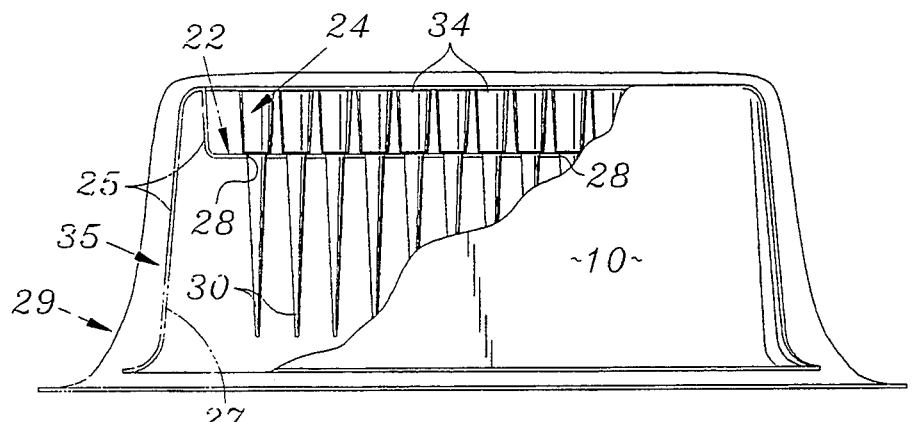
FIG. 1a is a side view, partially broken away to expose the interior of a basic pipette tip rack refill pack according to the present invention and including an organizing and support structure for an array of replacement pipette tips (which may comprise filter containing tips) housed for shipping and storage within a film pouch.
Figure 1B:
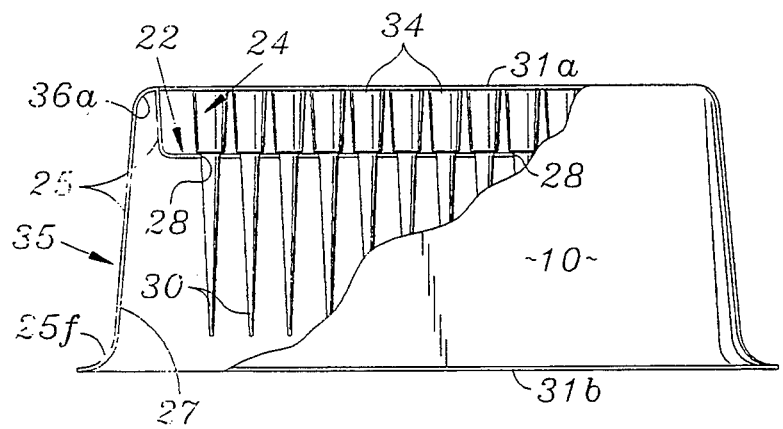
FIG. 1b is a side view similar to FIG. 1a except that the organizing and support structure is sealed top and bottom by removable lidstock.
Figure 1C:
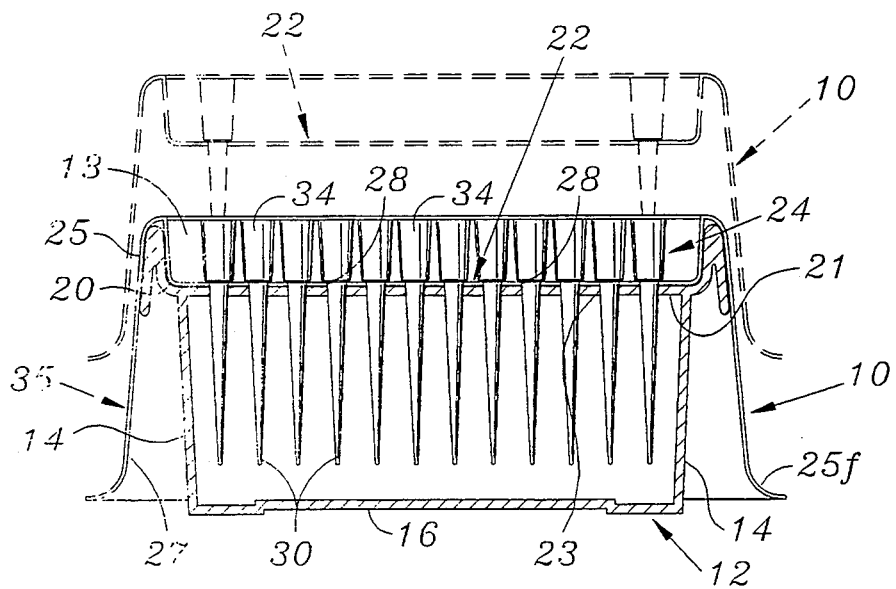
FIG. 1c is a side view depicting the organizing and support structure of FIGS. 1a and 1b, mounted on and refilling a reusable pipette tip rack; the dotted outline representing the organizing and support structure as it is centered over and guided onto the tip rack.

More particularly, the first basic embodiment comprises a single array refill pack 10 as shown in FIGS. 1a and 1b for refilling a rigid, reusable pipette tip rack 12 as shown in FIG. 1c. The rack 12 includes rigid side support members 14 extending vertically from a horizontal base 16 and joined at contiguous edges thereby forming a strong essentially rectangular container enclosed on five sides and with an open top 18. Formed in an inner surface of each side member 14 or attached thereto is a horizontal support or shoulder 20 vertically displaced from the base 16 and horizontally supporting a rigid pipette tip organizing tray 21. The tray 21 includes an array of horizontally spaced holes 23 for receiving distal end portions 30 of pipette tips 24 dispensed from the refill pack 10.

As depicted in FIGS. 1a and 1b, the single array refill pack 10 for pipette tips 24 comprises a horizontally extending pipette tip organizing and support structure 22 and a hand-gripable guide 35 formed as an integral unit of a light weight, low mass, semi-rigid or flexible plastic or equivalent material. The hand-gripable guide 35 comprises contiguous sidewall members 25 extending upwardly from a marginal edge of the support structure 22 and then bending downwardly and slightly outward to define skirt 27 for protecting the pipette tips 24 carried by the support structure 22 and having an open bottom for closely receiving the tip rack 12 as shown in FIG. 1c. In this regard, the skirt 27 is dimensioned relative to the tip rack 12 such that as the tip rack is received by the skirt, inner surfaces of the skirt slide along outer surfaces of the side support members 14 of the tip rack as the skirt is lowered over the tip rack. In this manner, the skirt 27 functions to center and guide the support structure 22 over and downward onto the tip rack 12 with the pipette tips mounted vertically in the holes 23 in the organizing tray 21 as shown in dotted and solid outline in FIG. 1c.

More particularly, the horizontal support structure 22 includes an array of horizontally spaced holes 28 corresponding to the array of holes 23 in the organizing tray 21. Each hole 28 is dimensioned to receive a distal end portion 30 of a disposable pipette tip 24 with its longitudinal axis in a vertical orientation. The support structure 22 thus supports the pipette tips 24 in an array with the distal end portions 30 of the tips 24 extending vertically through the holes 28 and proximal end portions 34 of the tips 24 extending vertically from an opposite side of the support structure 22. When the skirt 27 centers the support structure 22 over the tip rack 12, the distal end portions 30 of the pipette tips 24 are aligned with corresponding ones of the holes 23 in the organizing tray 21. Thus, the downward guiding of the support structure 22 by the skirt 27 over the tip rack 12 automatically positions and secures the distal end portions of the pipette tips 24 vertically in the holes 23 of the organizing tray 21 to reload the tip rack. This is accomplished without requiring a high degree of hand-eye coordination or manual dexterity on the part of the user. Further, as shown in FIG. 1c, when mounted on the tip rack 12, the support structure rests on the rigid organizing tray 21 and is supported by the rigid rack. Since the refill pack 10 thus depends on the tip rack for its structural support in subsequent loading of single and multiple tip pipettes, it can be and preferably is formed of a relatively low cost, light weight, semi-rigid or flexible plastic which may be recycled or if discarded represents a minimal contribution to non-biodegradable waste.

As shown in FIG. 1a, the refill pack 10 is stored within a thin flexible pouch 29 for shipping and storage. The refill pack is removed from the pouch 29 for use as previously described. In FIG. 1b, the refill pack 10 is protected against contamination and housed for shipping and storage by a removable top sheet 31a of lidstock sealed to a continuous upper marginal edge 36a of the sidewall members 25 and by a removable bottom sheet 31b of lidstock sealed to a continuous flange 25f extending horizontally from a lower edge of the skirt 27. The refill pack is readied for use as previously described by first removing the bottom sheet 31b. After the refill rack is mounted on the tip rack 12 as previously described, the top sheet 31a may be removed to expose the vertically oriented pipette tips 24.

Figure 2A:
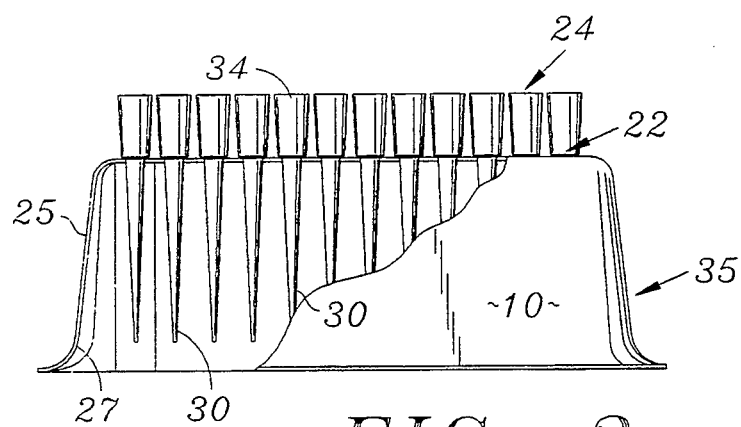
FIG. 2a is a side view, partially broken away to expose the interior of another basic form of the organizing and support structure of the refill pack of the present invention.
Figure 2B:
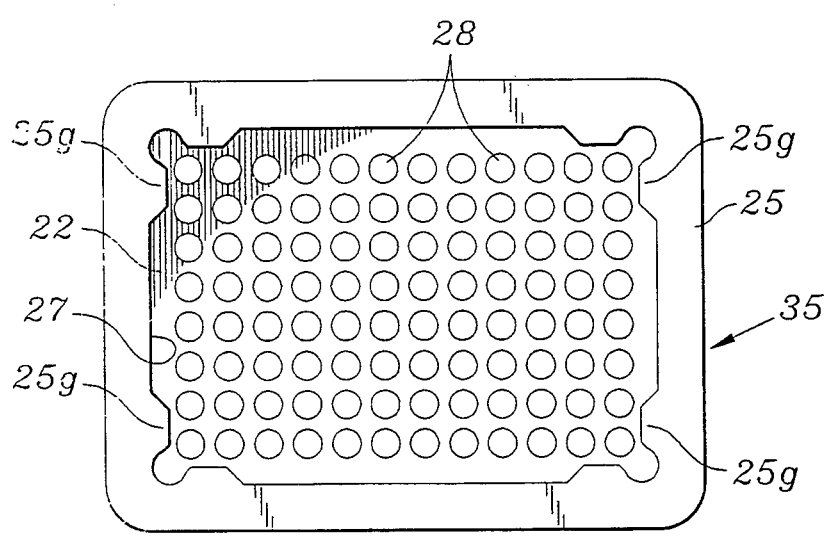
Figure 2C:
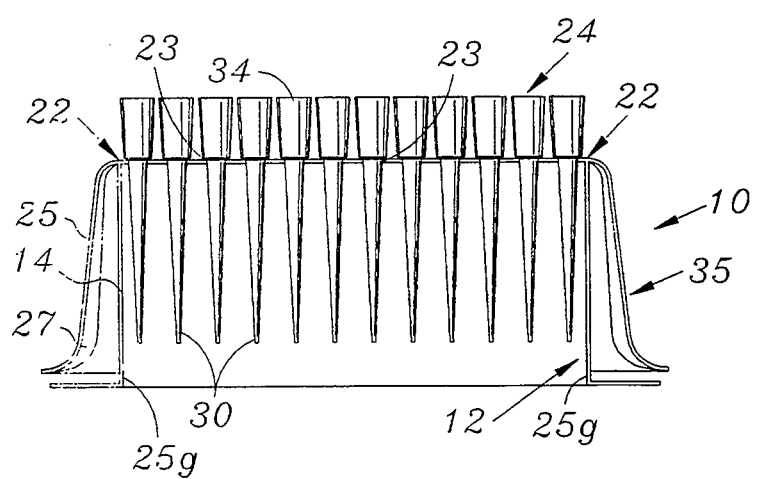
FIG. 2c shows the organizing and support structure of FIG. 2a mounted on a reusable pipette tip rack.
Figure 3:
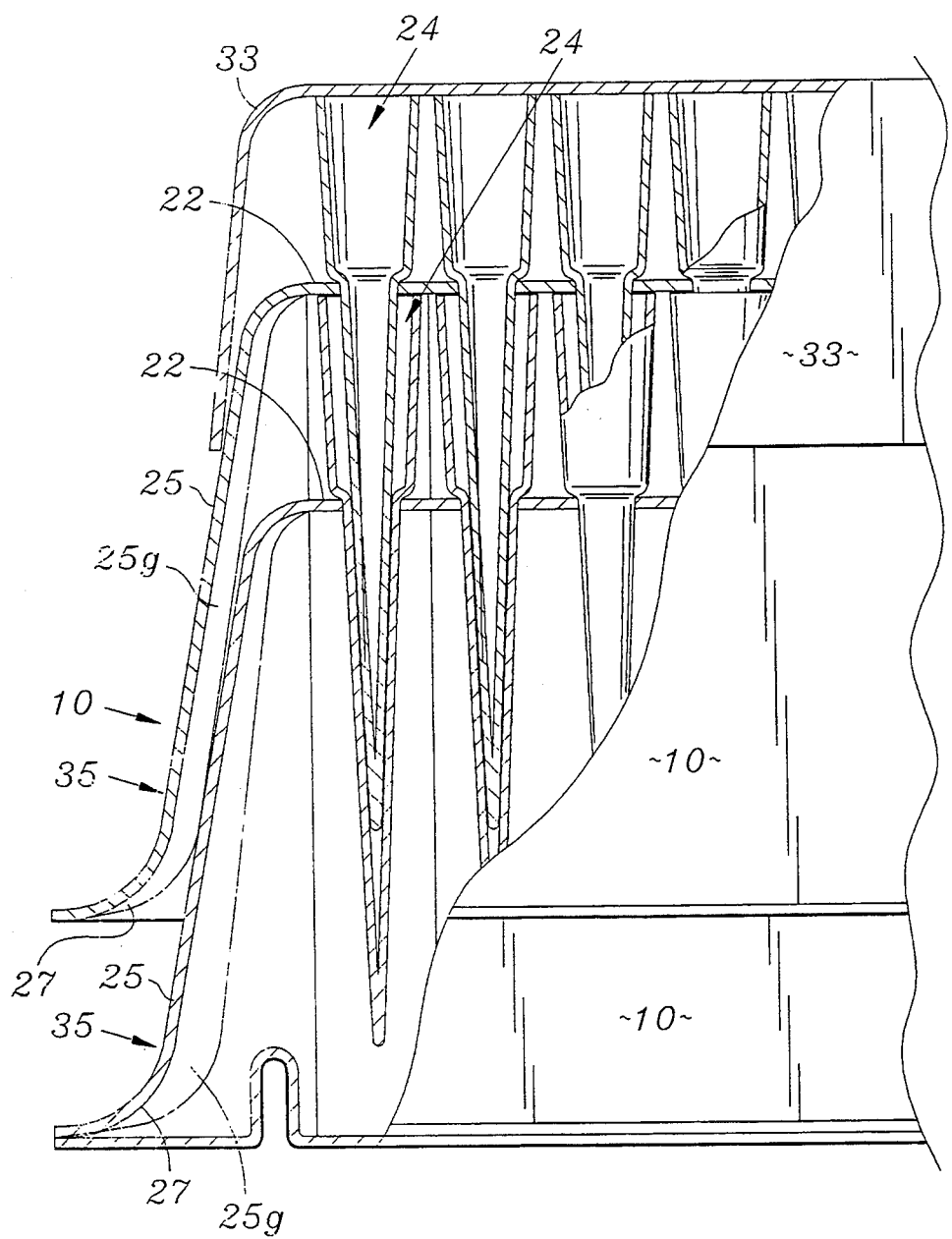
FIG. 3 is an enlarged side view, partially broken away of a stack of two organizing and support structures as shown in FIG. 2a, further including a top cover for the stack.

A second basic form of a single array refill pack is shown in FIGS. 2a, 2b and 2c. The refill pack 10 illustrated in FIG. 2a, closely resembles and functions the same as the refill pack of FIGS. 1a and 1b but with the sidewall members 25 extending outwardly and downwardly from a marginal edge of the support structure 22 to form the skirt 27. Also, the inner surfaces of the skirt are formed with spaced vertical guide surfaces 25g for engaging the outer surfaces of the side support members 14 of the tip rack 12 as the skirt 27 is lowered over the tip rack to the position shown in FIG. 2c. As shown in FIG. 3, a number of refill packs as shown in FIG. 2a can be stacked and nested with a cover 33 extending over an uppermost one of the packs to complete a stacked array of refill packs. In such stacking of the refill packs, the support structure 22 of an upper refill pack rests and is supported on the proximal end portions of the array of pipette tips 24 supported by a next lower refill pack.

Figure 4A:
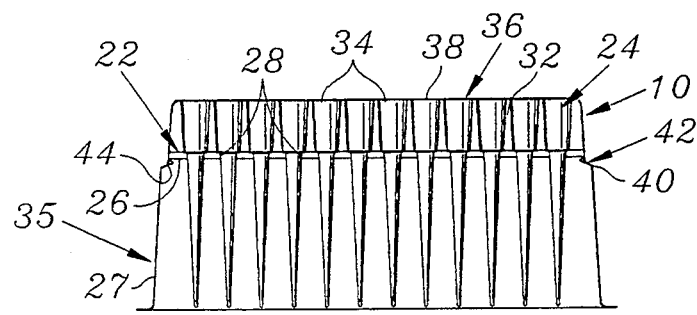
FIG. 4a is a sectional side view of a thin-wall lightweight single array pipette tip refill pack according to the present invention with extended sides forming (i) releasable means for retaining a pipette tip organizing and support plate and (ii) a guide for positioning and centering the organizing plate and an array of pipette tips supported thereby over a tip rack.
Figure 4B:
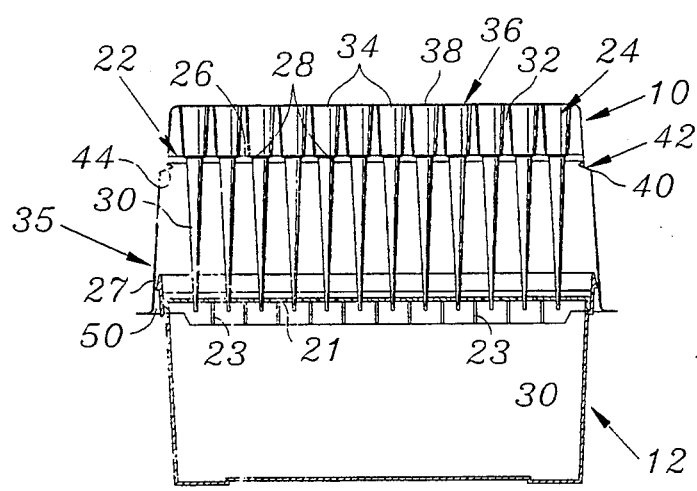
FIG. 4b is a side view similar to FIG. 4a further showing a typical pipette tip rack with the sides of the refill pack guiding the pack onto the rack with distal ends of the pipette tips (which may comprise filter containing tips) vertically aligned with and entering an array of holes in a horizontal organizing and support tray included in the tip rack.
Figure 4C:
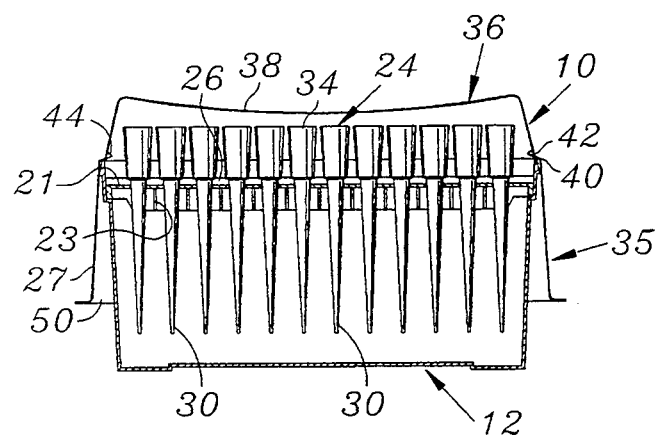
FIG. 4c is a side view similar to FIG. 1b illustrating a release of the pipette tips from the refill pack into the reusable tip rack.

FIGS. 4a through 4c depict a preferred single array refill pack according to the present invention. As shown, the support structure 22 of the refill pack comprises a separate, semi-rigid or flexible plastic, horizontally oriented rectangular support plate 26 having the array of holes 28 extending therethrough. As with the embodiments of FIGS. 1, 2 and 3, the array of holes 28 in the support plate 26 corresponds dimensionally and spatially to the array of holes 23 in the organizing tray 21 of the tip rack 12. Each hole 28 is dimensioned to just receive the relatively narrow and tapered distal end portion 30 of a pipette tip 24 with its longitudinal axis vertically oriented. The larger proximal end portion 34 of the pipette tip 24 will not fit through the hole 28 such that the proximal end portion extends vertically from the support plate 26 on a side opposite the distal end. In this manner, the support plate 26 supports the pipette tips 24 in an array 32 with the distal end portions 30 extending vertically through the holes 28 and the proximal end portions 34 extending vertically from an opposite side of the support plate for protection by the guide 35.

In the embodiment of FIG. 4a, the guide 35 comprises a dome-shaped cover or container 36, preferably formed of a thin, light weight flexible plastic material. In this regard, the cover 36 is formed with a horizontally extending, downward or inwardly flexible top 38 and with contiguous, outwardly flexible side members 40 extending vertically downward and slightly outward from a marginal edge of the top 38 to form the open bottom skirt 27. In addition, the cover 36 includes manually releasable means 42 for releasably securing the support plate 26 horizontally within the cover with the proximal end portions 34 of the pipette tips adjacent the inwardly flexible top 38 and with lower ends of the side members 40 extending beyond the ends of the distal end portions 30 of the tips 24 to enclose and protect the tips. Preferably, the releasable means 42 is formed in the side members 40 and comprises vertically positioned, inwardly extending horizontal protrusions 44 for releasably supporting and retaining the support plate 26 within the cover 36. The protrusions 44 are spaced from an open bottom 50 of the skirt 27 such that the proximal end portions 34 are captured in a chamber between the top 38 and the support plate 26 and the distal end portions 30 are confined by the skirt 27 which extends downwardly beyond the distal ends to provide protection therefor.

Figure 4D:
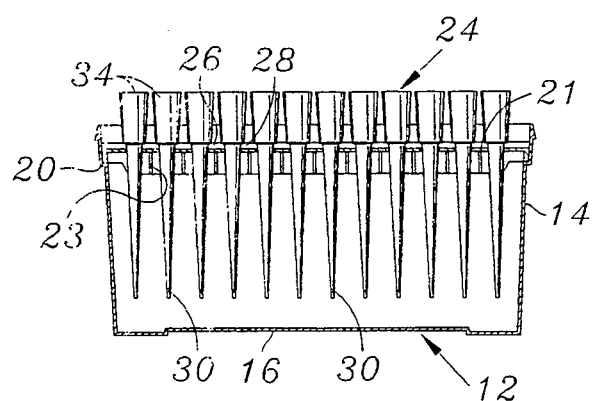
FIG. 4d is a side view of the tip rack of FIG. 4b and 4c refilled with the array of pipette tips.
Figure 6:
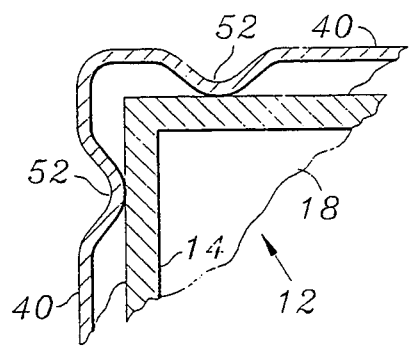
FIG. 6 is a vertical section view along the line 6—6 in FIG. 5 showing a typical corner detail of the refill pack guide means for positioning the refill pack on a tip rack.
Figure 5:
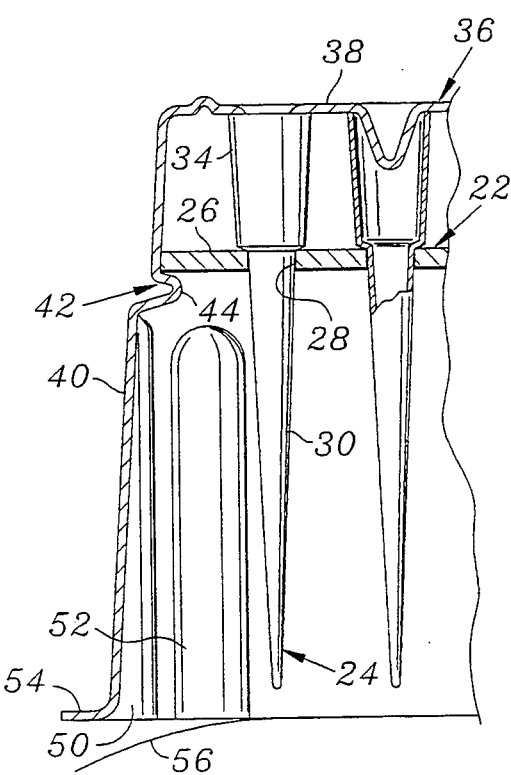
FIG. 5 is an enlarged partial side view of the refill pack of FIG. 4a showing the detail of the extended sides with the guide indentations for positioning the refill pack and also showing the detail of the positioning indentations in the cover for holding the pipette tips in a vertical position.

Further, as shown in FIGS. 5 and 6, the side members 40 extend beyond the releasable means 42 and include at the corners of the cover 36, vertically extending protrusions or guides 52 for guiding the cover 36 over and onto the open top 18 of the tip rack 12 as shown in FIG. 6. Still further, ends of the side members 40 remote from the top of the cover 36 project outwardly at right angles to the vertical side members 40 to form a continuous horizontal flange 54 surrounding the opening 50 for attaching a sheet 56 of removable lidstock. The sheet 56 provides means for enclosing the opening 50 of the cover 36 with a material suitable for autoclaving or irradiating and for permitting identifying labelling to be applied thereto or embedded therein. Removal of the sheet of lidstock 56 prepares the refill pack 10 for reloading of the empty tip rack 12 as shown in FIGS. 4b, 4c and 4d.

In these regards, the skirt 27 is dimensioned relative to the rack 12 so as to position and center the support plate over the open top 18 of the tip rack as the skirt is lowered onto the rack as shown in FIGS. 4b and 4c. During such lowering of the skirt, the guides 52 engage and ride downwardly on the outer surfaces of the side support members of the tip rack as shown in FIG. 6. Further, as depicted in FIGS. 4b and 4c the guiding and centering provided by the skirt 27 aligns the distal end portions 30 of the pipette tips 24 with the holes 23 in the organizing tray 21 of the tip rack such that upon a lowering of the skirt, the distal end portions vertically enter and are seated within the holes 23. With the skirt thus positioned, the user presses downward on the top of the cover 36 to inwardly flex the cover and outwardly flex the side members 40 as shown in FIG. 4c. With such outward flexing of the side members 40, the support plate is released by the releasable means 42 to fall downwardly onto the organizing tray 21 for support thereby. The cover 36 then is removed leaving the reloaded tip rack as depicted in FIG. 4d. From the foregoing, it is appreciated that the preferred basic form of the present invention possess all of the previously listed desired structural and function features of a refill pack for reloading empty reusable tip racks. In particular, the refill pack is easy to use and automatically positions an array of replacement pipette tips in the tip rack. Further, the refill pack depends on the tip rack for structural strength during subsequent loading of pipette tips onto single and multiple-tip pipettes. Therefore, the refill pack is formed of light weight, semi-rigid or flexible, low mass plastic materials presenting a minimum of disposable waste.

Figure 8:
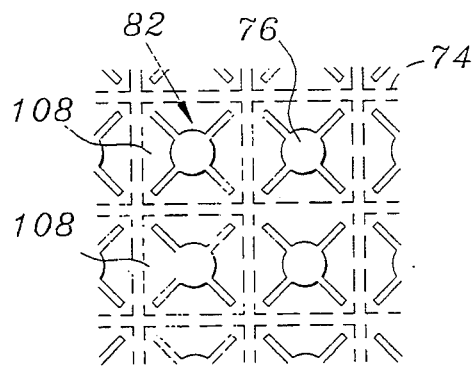
FIG. 8 is an enlarged partial top view of a punched sheet forming variable size holes for control of nested pipette tip release in the embodiment of FIG. 7.
Figure 7:
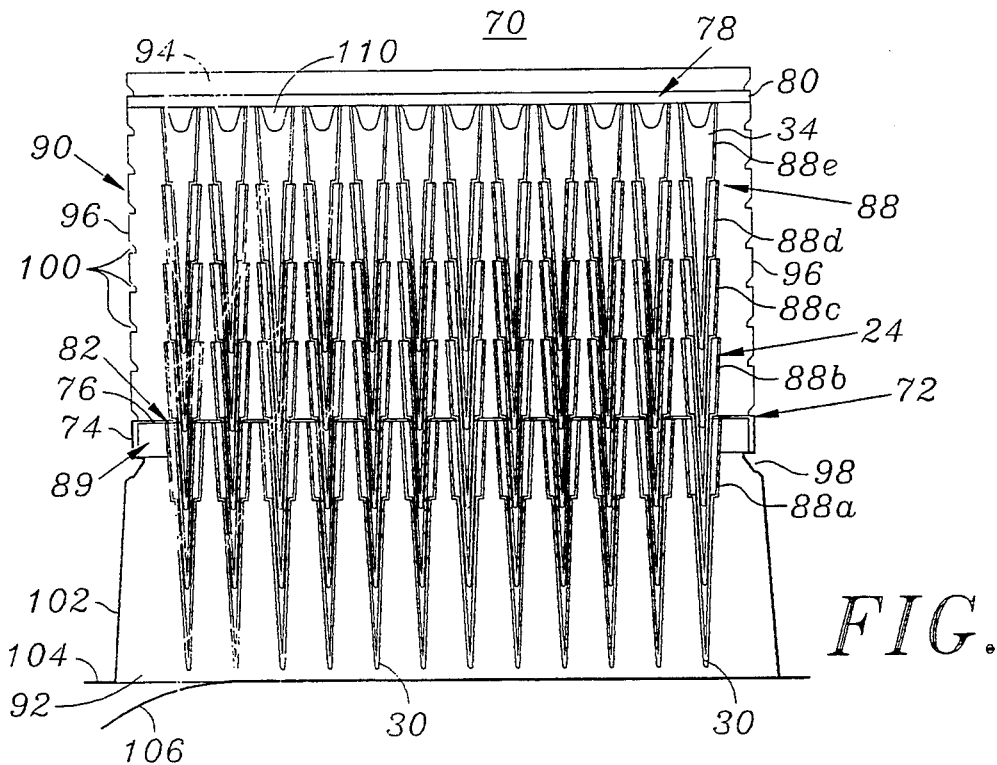
FIG. 7 is a side view of a transparent plastic multiple array refill pack showing conventional pipette tips telescoped, positioned in a support grid carrier plate and contained in a multiple dispenser thin-wall shell.
Figure 9:
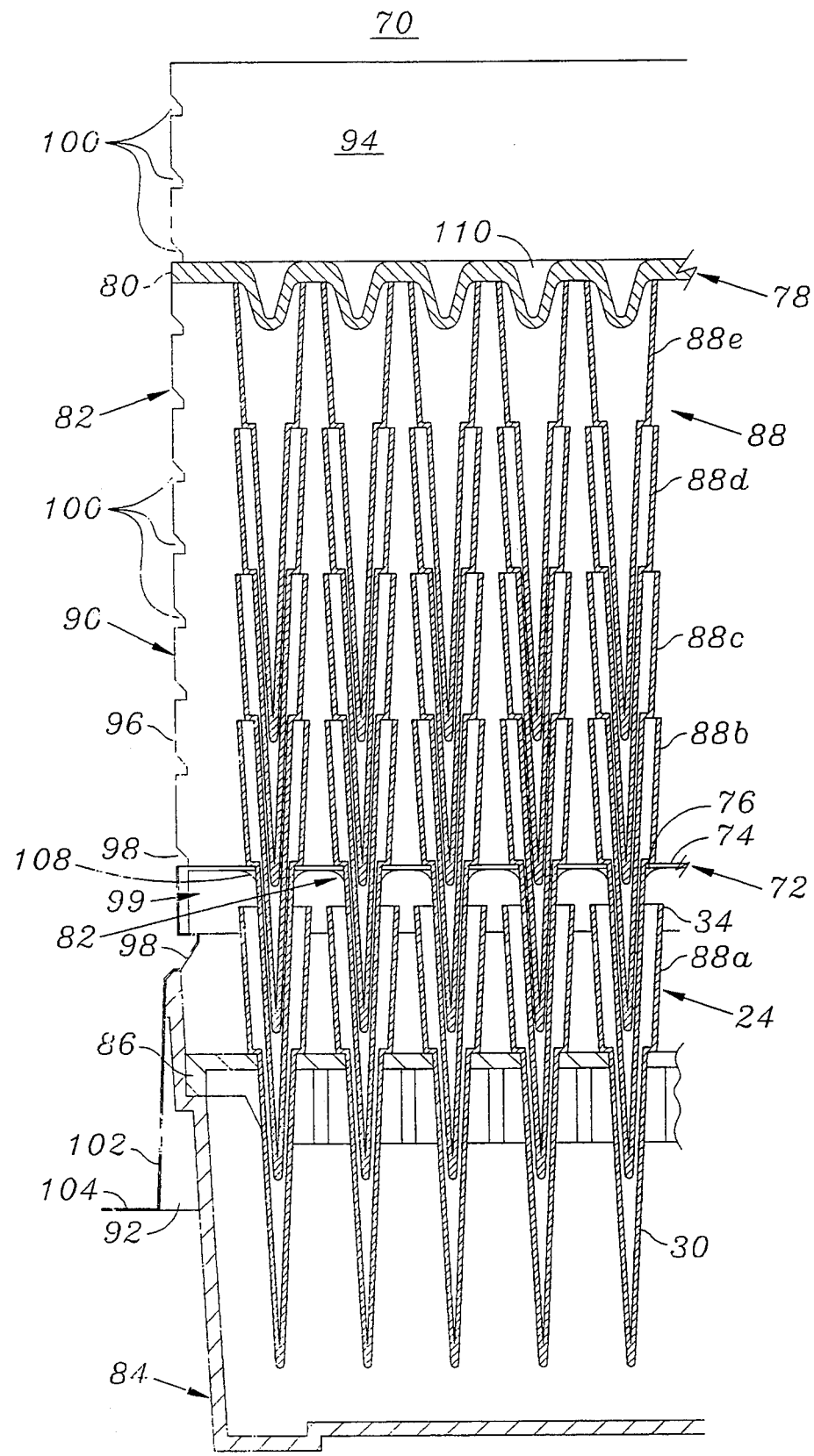
FIG. 9 is an enlarged partial side view of the embodiment of FIG. 7 partially in section and positioned on a tip rack.
Figure 10A:
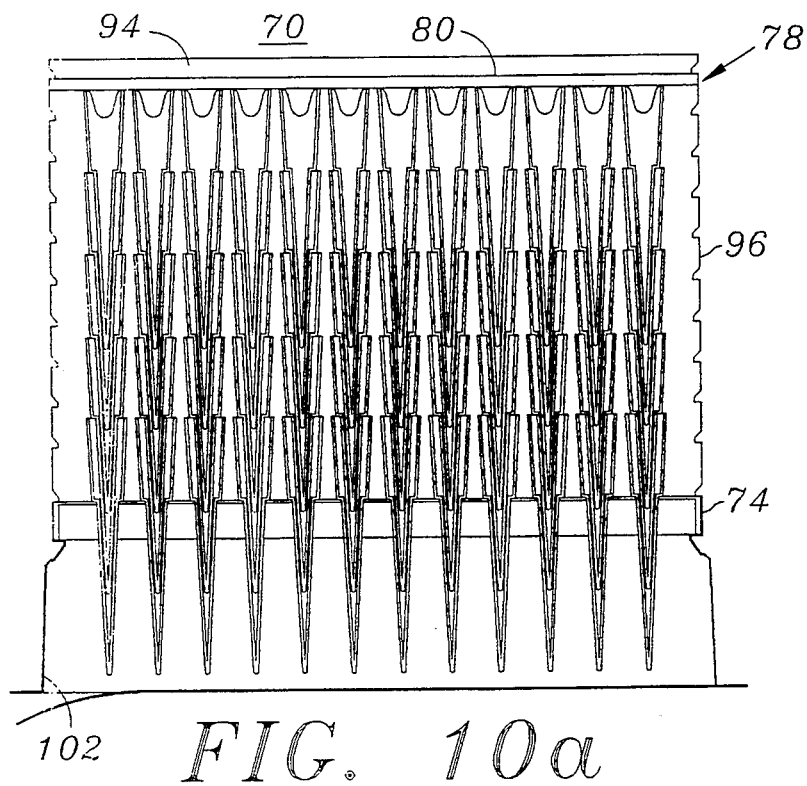
FIGS. 10a, 10b and 10c depict the refill pack of FIG. 7 and the process of refilling an empty tip rack with a replacement array of pipette tips from the refill pack of FIG. 7.
Figure 10B:
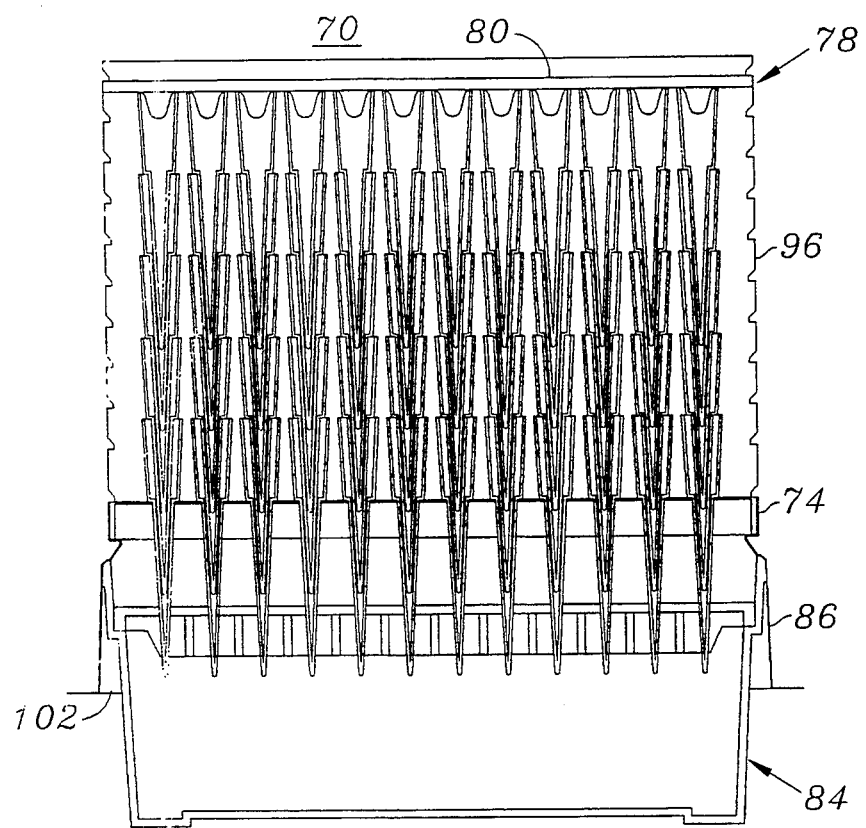
Figure 10C:
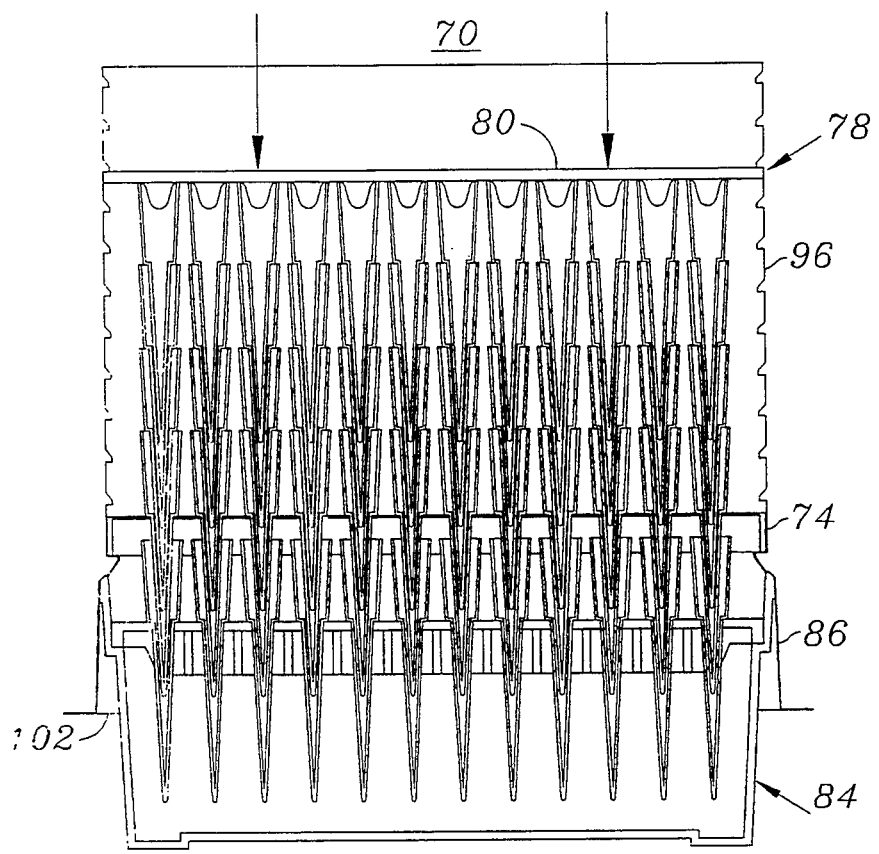

A second preferred embodiment of the present invention possessing all of the foregoing features comprises the refill pack 70 for nested multiple arrays of pipette tips shown in FIGS. 7, 8, 9 and 10a–10c. Refill pack 70 comprises (1) an organizing means 72 including a support plate 74 with an array of holes 76 vertically supporting pipette tips 24, (2) a cover means 78 for confining the proximal end portions 34 of the uppermost pipette tips 24 and including a push plate 80, and (3) a releasable means 82 for releasably securing the proximal end portion 34 of the pipette tips 24 in the organizing means 72. Upon application of a downward force actuating the releasable means 82, a lowermost array of the pipette tips 24 drops vertically from the refill pack 70 into a tip rack 84 containing a horizontally extending pipette tip organizing tray 86. In this regard, and as most clearly shown in FIG. 9, a lower end of the cover means 78 forms an open-bottom skirt 102 which is dimensioned to guide and center the organizing means 72 over the organizing tray 86 of the tip rack 84 with distal ends of the lowermost array of tips 24 aligned with corresponding holes in the tray to provide vertical support for the tips as they drop into the organizing tray. The foregoing sequence of use of the refill pack 70 in reloading the tip rack 84 is depicted in FIGS. 10a–10c. FIG. 10a depicts the refill pack 70 as stored ready for use. FIG. 10b depicts the refill pack 70 over the tip rack 84 with the skirt 102 guiding and centering the refill pack onto the rack with the distal end portions of a lowermost array of pipette tips 24 aligned with and entering the array of holes in the organizing tray 86. FIG. 10c depicts the dispensing of the lowermost array of pipette tips from the refill pack 70 in response to a downward manual movement of the push plate 80. More particularly, as most clearly shown in FIGS. 7 and 9, the refill pack 70 vertically separates arrays 88a–e of horizontally spaced pipette tips 24 telescopically stacked within the pack with distal end portions 30 of pipette tips 24 in the lowermost array 88a extending downward through the holes 76 in the horizontally oriented support plate 74. The distal end portions 30 of the pipette tips 24 in the next lowermost array 88b telescope into the proximal end portions 34 of the pipette tips 24 in the array 88a while distal end portions 30 of the pipette tips 24 in the array 88c telescope into the proximal end portions 34 of the pipette tips 24 in the array 88b and so on up to the array 88e, all as shown in FIGS. 7 and 9. As depicted, each pipette tip 24 in each of the arrays 88a–e is equally displaced in a vertical direction from a similarly placed tip 24 in an adjacent vertical stack so as to create equally spaced layers of arrays.

In the refill pack 70, the proximal end portions 34 of the uppermost pipette tips 24 engage the cover means 78 comprising the horizontally oriented push plate 80 within a four sided tubular container 90. The container 90 may be formed of a light weight plastic and is dimensioned to receive and capture the horizontal support plate 74 of the organizing means 72 at a lower open end 92 and to receive the push plate 80 at an upper open end 94 of the container 90. Opposing sides 96 of the tubular container 90 are essentially rectangular, parallel, vertically oriented and mutually attached at contiguous edges thereby enclosing an essentially rectangular volume. The sides 96 include vertically spaced and horizontally extending inward projections 98 positioned to constrain and position the organizing means 72 with marginal edges within a channel 99 adjacent to the lower opening 92 of the container 90. Thus positioned, the support plate 74 places the pipette tips 24 of the lowermost array 88a with distal end portions 30 of the pipette tips 24 extending downward through the array of holes 76 in the support plate 74 for protection within the lower end of the container 90. Additional inward projections 100 in the sides 96 of the container 90, comprise horizontally separated, vertical series of triangularly shaped ramps, spaced at equal intervals vertically above the support plate 74 to permit downward incremental movement of the push plate 80 and prevent an upward return movement. The distance of the downward incremental movement of the push plate 80 thereby affects a sequential releasing of the lowermost one of the arrays 88 of pipette tips 24 from the telescoped vertical stack of pipette tips 24 through the holes 76 in the support plate 74 into the holes in a tray 86 in the pipette tip rack 84 and a positioning of the distal end portions 30 of the next lowermost array of pipette tips 24 in the holes 76 for subsequent release.

As shown in FIG. 9, the sides 96 also form a skirt 102 at the lower open end 92 of the container 90 for positioning the refill pack 70 over the tip rack 84 with the distal end portions 30 of the pipette tips 24 extending downward therein and aligned with holes in a tray 86 in the tip rack 84 as depicted by the sequence of FIGS. 10a–10c.

While the refill pack 70 may be provided commercially in a package on top of an empty tip rack, such as 84, and secured thereto by a removable band surrounding a junction between the sides 96 and the tip rack, alternatively as shown in FIG. 7, the open end of the refill pack may be closed by a removable sheet of lidstock. In that regard, as shown in FIG. 7, at the lowermost edge of the guide 102, the vertical sides 96 of the container 90 extend horizontally outwardly forming a flange 104. The flange 104 extends continuously around the opening 92 and provides for attachment of a lidstock 106 to protect the downward extending distal end portions 30 of the pipette tips 24. The lidstock 106 may be attached by adhesive, thermal bonding, or mechanical means.

As shown in FIGS. 8 and 9, the releasable means 82 for releasably securing the organizing means 72 relative to the cover means 78 comprises the series of inward projections 100 for engaging the push plate 80 as already described and moveable means 108 extending into the holes 76 of support plate 74 to define enlargable openings for receiving and holding the distal end portions 30 of the lowermost array 88a of pipette tips 24. The moveable means 108 receive and enlarge to pass the proximal end portions 34 of the lowermost array 88a of pipette tips 24 and to dispense the array 88a into the tip rack 84 with a downward movement of the arrays 88a–e in response to corresponding downward movement of the push plate 80 against the proximal end portions 34 of the uppermost array 88e of the pipette tips. Following the passage and release of the proximal end portions 30 of the array 88a of pipette tips 24, the moveable means 108 extending into each hole 76 returns to its smaller dimension to accept the distal end portions 30 of the next lowermost array 88b of telescoped pipette tips 24 as they descend into a dispensing position. The foregoing dispensing operation may then be repeated for the array 88b and so on until all of the arrays of pipettes are dispensed by the refill pack into pipette tip racks.

As previously noted, the cover means 78 as shown in FIGS. 7 and 9 comprises the horizontally oriented rigid push plate 80. As shown the push plate preferably includes a plurality of spaced indexing means 110 fitting into the proximal end portions 34 of uppermost array 88e of pipette tips 24. The spaced indexing means 110 may take the form of indentations with the center of each indentation coincident with the center of identically located holes 76 arrayed in the support plate 74. Such an arrangement maintains the longitudinal axes of the stack pipette tips forming arrays 88a–e in vertical alignment within the container 90 for successive release of the lowermost ones of the pipette tip arrays into the pipette tip tray 86 of the rack 84 as described above.

As previously noted, the third preferred embodiment of the present invention comprises a stacked multiple array refill pack 130 as shown in FIGS. 11 and 12. Generally speaking, the refill pack 130 resembles the refill pack 70 of FIGS. 7–10c and comprises a vertical tubular container 148 forming a basic element of a cover means 134 for the refill pack 130. As illustrated, the container 148 may be formed of a thin light weight plastic material and houses (1) an organizing means 132 including carrier plates (138a–i), each with an identical array of holes 140 (corresponding to the array of holes 23 in the organizing tray 21 of the tip rack 12) and each supporting an array (133a–i) of pipette tips 24, (2) the balance of the cover means 134 comprising a removable cover 142 and a push plate 144, and (3) a releasable means 136 releasably securing the organizing means 132 relative to the cover means 134.

In addition, a lower annular portion of the container 148 forms a skirt 160 for positioning and guiding the container over and onto the tip rack 12. As shown in FIG. 11, when the container 148 is positioned over the tip rack 12, the distal end portions 30 of a lowermost array 133a of pipette tips 24 extend into corresponding holes 23 in the organizing tray 21 of the fully loaded tip rack 12. The tip rack 12 is banded to the container 148 by a removable plastic sleeve (not shown) to complete a ready-for-shipment package.

When it is desired to use the pipette tips 24, the band is removed to separate the container 148 from the tip rack. The pipette tips 24 are then dispensed from the rack 12 in a conventional manner. When all the pipette tips have been dispensed from the rack, the container 148 is then nested over the now empty tip rack 12. When so positioned, actuation of the releasable means 136 releases the lowermost carrier plate 138a (corresponding in structure to the previously described support plate 26) containing the array 133a into the tip tray 21 thereby refilling the pipette tip rack 12. Once the rack 12 has dispensed the array 133a onto single or multiple-tip pipettes, the foregoing operation may be repeated to again refill the rack 12 with the next lowermost array 133b of pipette tips 24, and so on. In the dispensing of pipette tips from the tip rack 12, structural support for the carrier plates 138 is provided by the tip rack 12. For that reason, the carrier plates may be formed of a thin light weight semi-rigid plastic material which upon disposal represents a minimum of non-biodegradable waste.

More particularly as shown in FIG. 11, each of the plurality of horizontally oriented carrier plates 138a–i, has an array of holes 140 corresponding to the array of holes 23 in the organizing tray 21 of the tip rack 12. Each hole 140 receives a distal end portion 30 of a disposable pipette tip 24 which extends vertically downward therethrough with the proximal end portion 34 of the tip extending vertically upward therefrom. Thus, the carrier plates 138a–i position the arrays 133a–i of pipette tips 24 with each pipette tip 24 longitudinal axis in a vertical orientation. The plurality of carrier plates 138a–i are stacked in the container 148 with the distal end portions 30 of pipette tips 24 of the array 133i in the uppermost carrier plate 138i extending within the proximal end portions 34 of pipette tips 24 of the array 133h supported by the next lower carrier plate 138h and so down to the lowermost carrier plate. In such a nesting arrangement for the pipette tips, the upper carrier plate 138i rests on top of the proximal end portions 34 of pipette tips 24 of the array 133h in the carrier plate 138h while the carrier plate 138h rests on top of the proximal end portions of the pipette tips 24 of the array 133g in the carrier plate 138g and so on down to the lowermost carrier plate. Thus arranged, the lowermost carrier plate 138a becomes a support plate 146 when it is positioned against the releasable means 136 for releasably restraining the support plate 146 relative to the cover means 134.

As illustrated, the cover means 134 comprises the container 148, the removable cover 142 and the push plate 144. The cover 142 encloses an open upper end 152 of the container 148 and covers the open upper end 18 of the tip rack 12 when it is separated from the refill pack 130. The push plate 144 resides in the container 148 at the upper open end 152 and rests on the proximal end portions 34 of the pipette tips 24 in the array 133i. When external downward force is applied to the push plate 144, it moves downward pressing against the uppermost array 133i of pipette tips 24 to transmit the force through the arrays 133a–h to the lowermost array 133a. Each carrier plate 138a–i sequentially moves downward, becoming the support plate 146 and is ejected by action of the indexed downward movement of the push plate 144 against the proximal end portion 34 of the array 133*i* of pipette tips 24 within the refill pack 130.

In the refill pack 130, the releasable means 136 is part of the four sided tubular container 148. As shown, the container 148 is dimensioned (i) to receive, support and transport the horizontal carrier plates 138*a–i*, each sequentially into position as the support plate 146 at a lower open end 150 of the container 148 and (ii) to receive the push plate 144 at the upper open end 152 of the container 148 after the removal of the cover 142. Opposing sides 154 of the tubular container 148 are essentially rectangular, parallel, vertically oriented and mutually attached at contiguous edges thereby enclosing an essentially rectangular volume. The sides 154 include vertically positioned and horizontally extending inward projections 156 for releasably supporting and positioning the support plate 146 marginal edges within the lower opening 150 of the container 148. Thus positioned, the support plate 146 places the distal end portions 30 of the lowermost array 138*a* of pipette tips 24 for protection within the lower end 150 of the container 148.

As shown in FIG. 12, additional inward projections 158 in corners of the sides 154 of the container 148, comprise horizontally separated series of triangular shaped ramps, spaced at equal intervals vertically above the support plate 146 so as to permit incremental downward movement of the push plate 144 and prevent an upward return movement thereof. As shown in FIG. 12, the inward projections 158 are positioned to constrain only the movement of the push plate 144 by contact with the corners thereof. As illustrated, bevelled corners of the carrier plates 138*a–i* do not permit the inward projections 158 to contact the peripheral edges of carrier plates 138*a–i*. The incremental downward movement of the push plate 144 thereby affects sequential releasing of the lowermost array 133*a* of pipette tips 24 contained in the support plate 146 to drop into the tip rack 12 and positioning the next lowermost carrier plate 138*b* as the support plate 146 for subsequent release. Release of the support plate 146 results from the downward pressure of the push plate 144 applied against the proximal end portions 34 of the uppermost array 133*i* of pipette tips 24 and thereby against the carrier plate 138*i* and thereafter through the arrays 133*a–h* of pipette tips and carrier plates 138*b–h*. The downward pressure of the support plate 146 against the indentations 156 causes sides 154 to flex outward slightly, for releasing the support plate 146 into the tip rack below.

As shown in FIG. 11, the sides 154 also form the skirt 160 at the lower open end 150 of the container 148 for positioning, centering and guiding the refill pack 130 over the tip rack 12. The positioning provided by the skirt 160 is such that the distal end portions 30 of the lowermost array 133*a* of pipette tips 24 contained in the support plate 146, extend downward therefrom and are positioned for dispensing into the tip rack 12. At the lowermost edge of the skirt 160, the vertical sides 154 of the container 148 extend horizontally outwardly forming a continuous surrounding flange 162 for opening 150. When the container 148 is packaged separate from a fully loaded tip rack, the flange 162 provides for attachment of a sheet of lidstock as in FIG. 7 to protect the downward extending distal end portions 30 of the pipette tips 24. The lidstock may be attached to the flange 162 by adhesive, thermal bonding, or mechanical means.

In the embodiments of the present invention shown in FIGS. 7-12, it is an important feature in dispensing the pipette tips from the refill packs that the arrays be dispensed one at a time. Further, when the refill packs are combined with pipette tip racks within a wrapped package, as previously described, it is important that the arrays of pipette tips be secure and not subject to excessive movement relative to their supporting housings. To achieve such important objectives, the dimensioning of the refill packs relative to the tip racks is such that when an array of pipette tips is seated in the tip rack either by preloading as part of a combination package with a refill pack, or after a lowermost array of pipette tips has been dispensed from a refill pack into a previously empty tip rack, the pipette tips in the tip rack and the supporting tip rack tray form a hard stop for the stacks of arrays of pipette tips above the tip rack preventing downward movement of the stacked arrays. In the embodiments of FIG. 7 and 9, the vertical stacking of the pipette tips is such that an outer surface of the proximal end portions of each tip (except a lowermost tip) bears on and is supported by an upper end of the proximal end portion of a next lower tip. Thus, when the pipette tips supported on a tip rack tray and the tray establish a hard stop, a downward force on the vertical stacks will not produce a corresponding downward movement or a dispensing of an array of pipette tips by the refill pack. Likewise, in the embodiment of FIGS. 11 and 12, the carrier plates 138*b–i* each rest on a top of a proximal end portion of a next lower array of pipette tips and the carrier plate 138*a* rests on top of the pipette tips supported by the tip rack tray. Thus, when the pipette tips supported by the tray and the tray combine to form a hard stop, a downward force on the vertical stacks will not produce a corresponding downward movement or a dispensing of an array of tips by the refill pack. In these regards, in FIGS. 9 and 11, for purposes of clarity in illustrating the support plates, the bottom of the support plates are shown spaced from the tops of the proximal end portions of the pipette tips supported by the tip rack. To prevent inadvertent downward movement of the stacked arrays of pipette tips relative to the array of tips in the rack, the dimensioning of the refill packs is such that the tip of the proximal end portions of the tips in the tip rack engage or are very closely spaced from the under surface of the support plates to combine with the tip rack tray to provide the desired hard stop.

Figure 13A:
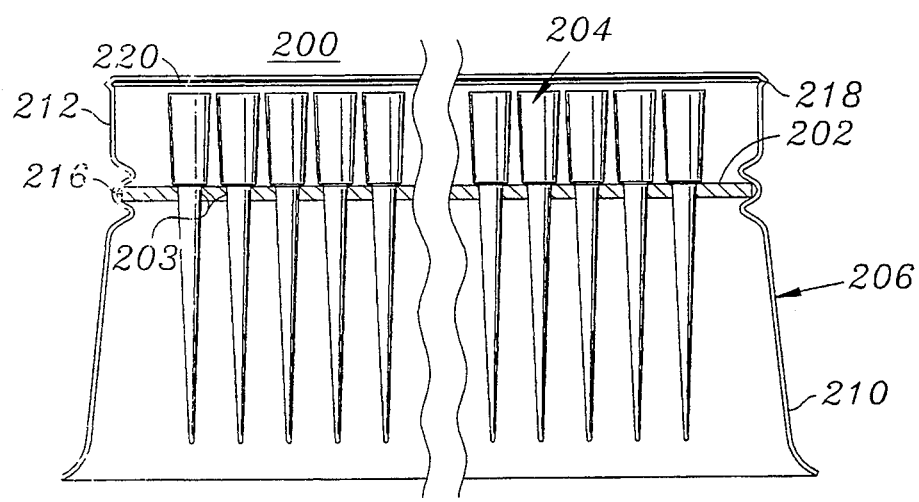
FIG. 13a is a sectional side view with a central portion removed and showing an embodiment of a thin-wall lightweight tubular shell refill pack with a horizontal support plate and releasable side fastening means. The tubular shell provides protection for the contained pipette tips and functions as a guide for the support plate and array of pipette tips carried thereby on an empty tip rack to refill the rack as shown in FIG. 13c.

A final and simplified single array refill pack 200 is depicted in FIGS. 13*a*, *b* and *c*. As shown in FIG. 13*a*, the refill pack 200 comprises the previously described basic combination of (1) a semi-rigid support plate 202 with an array of holes 203 carrying an array of pipette tips 204, and (2) a thin flexible hand-gripable positioning and guide means 206 for hand moving the support plate 202 over an open top of an empty tip rack 208, as shown in FIG. 13*c*, and for separating from the support plate for dispensing the support plate and array of tips into the tip rack. To simplify the placement of the refill pack 200 over the tip rack 208, the guide means 206 includes a tubular skirt 210 extending downward beyond the distal ends of the pipette tips carried by the support plate 202. The skirt is dimensioned to closely receive the top of the tip rack with inner surfaces of the skirt engaging the side support members of the tip rack to center the support plate and the pipette tips over the tip rack and to slide downward along the side support members as the skirt is lowered onto the tip rack to the position shown in FIG. 13*c*.

More particularly, the guide means 206 comprises a hand-gripable sleeve 212 surrounding and releasably securing marginal edges of the support plate 202. Preferably, the sleeve is formed by a band of flexible material having its opposite ends secured by latching means 214. The band is formed with a longitudinally extending channel 216 near the middle thereof such that when the band is wrapped around the support plate 202, the marginal edges of the support plate fit securely into the channel, defining a channel for releasably securing the support plate. The band also is formed along it upper edge in a longitudinally extending channel 218 which when the band is wrapped around the support plate defines an upper channel for receiving a removable cover 220 for the refill pack.

Figure 13B:
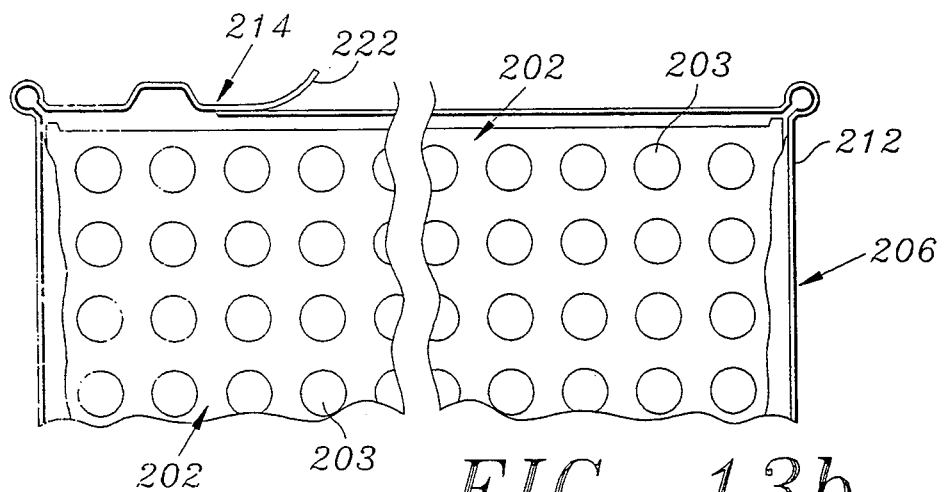
FIG. 13b is a fragmentary top view of the embodiment of FIG. 13a showing the tubular shell surrounding and releasably constraining the support plate and showing the releasable fastening tab.
Figure 13C:
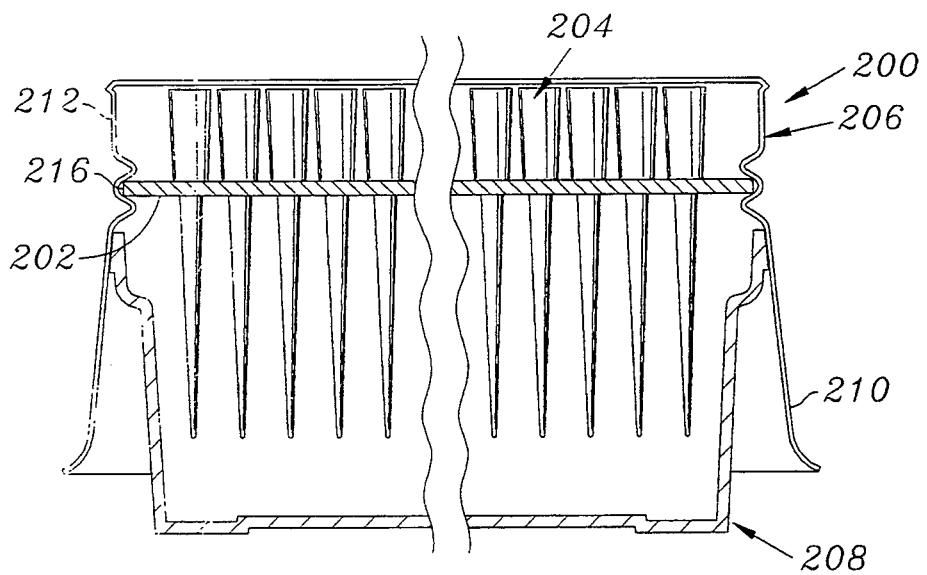

FIG. 13b depicts the refill pack 200 with the cover removed and illustrates the array of holes 203 in the support plate 202 as well as the releasable latching means 214. As shown, the latching means 214 comprises a releasable connection between the opposite ends of the .band and a tab 222 extending from the outermost end of the band as wrapped around the support plate.

In use, the refill pack 200 is picked up by a user grasping the sleeve 212. The user moves the refill pack over the empty tip rack with the skirt receiving the top of the rack. The user then lowers the sleeve while the skirt guides the support onto the tip rack and the distal end portions of the pipette tips into the holes in the organizing tray of the rack. Then, grasping the tab 222, the user pulls on the sleeve to release the latching means and separate the sleeve. This allows the top cover and the sleeve to separate from the support plate and the support plate and array of pipette tips to seat on the organizing tray to refill the tip rack.

From the foregoing description of the various preferred embodiments illustrated in the drawings, it should be appreciated that the present invention may take many various forms and that the invention is to be limited only by the following claims.

We claim:

1. For use with an empty reusable pipette tip rack including side support members extending vertically from a base support surface for the rack and supporting a rigid horizontally extending organizing tray having an array of holes therethrough for vertically receiving and horizontally positioning an array of pipette tips within the rack, a refill pack comprising:
   an array of pipette tips with distal end portions and proximal end portions;
   hand-gripable and moveable positioning and guide means of light weight, low mass material for receiving and horizontally supporting the array of pipette tips and including a guide having an open bottom for centering the array of pipette tips over and guiding the array of pipette tips into the empty pipette tip rack with the distal end portions of the pipette tips vertically positioned in and through the array of holes in the organizing tray; and
   releasable means (i) for releasably securing the array of pipette tips within the positioning and guide means and (ii) for actuation by a user to release the array of pipette tips from the positioning and guide means downward through the open bottom of the guide into the holes in the organizing tray when the positioning and guide means is over and on the empty pipette tip rack to effect a refilling of the empty pipette tip rack.

2. For use with an empty reusable pipette tip rack including side support members extending vertically from a base support surface for the rack and supporting a rigid horizontally extending organizing tray having an array of holes therethrough for vertically receiving and horizontally positioning an array of pipette tips within the rack, a refill pack comprising:
   pipette tip organizing and support means including a horizontally extending support structure having an array of holes therethrough for receiving distal end portions of pipette tips to vertically support and horizontally organize an array of pipette tips;
   an array of pipette tips with distal end portions extending vertically through the holes in the support structure and proximal end portions extending vertically above the support structure;
   hand-gripable and moveable refill pack positioning and guide means of light weight, low mass material for protecting the distal end portions of the pipette tips during shipping and storage, and (2) centering the refill pack over and guiding the refill pack onto the empty pipette tip rack with the distal end portions of the pipette tips vertically positioned in and through the array of holes in the organizing tray corresponding to the array of holes in the horizontally extending support structure of the pipette tip organizing and support means, the positioning and guide means including a tubular support portion receiving and horizontally supporting the support structure of the organizing and support means with the distal end portions of the array of pipette tips extending through the holes in the support structure and hand-gripable lower sidewall members extending vertically downward from the tubular support portion beyond the distal end portions of the pipette tips to form a guide having an open bottom below the distal end portions of the pipette tips and dimensioned to closely receive a top of the empty pipette tip rack with the sidewall members of the guide sliding downwardly along the side support members of the rack to guide the refill pack onto the empty pipette tip rack with the distal end portions of the pipette tips aligned vertically over and extending vertically into the holes in the organizing tray; and
   releasable means (i) for releasably securing the array of pipette tips within the positioning and guide means and (ii) for actuation by a user to release the array of pipette tips from the positioning and guide means downward through the open bottom of the guide into the holes in the organizing tray when the positioning and guide means is over and on the empty pipette tip rack to effect a refilling of the empty pipette tip rack.

3. The refill pack of claim 2 wherein the releasable means comprises enlargable means in the holes in the support structure of the organizing and support means for enlarging to release the array of pipette tips through the holes in the support structure in response to a downward force on the array of pipette tips.

4. The refill pack of claim 3 further including push means for exerting the downward force on the array of pipette tips.

5. The refill pack of claim 2 wherein the positioning and guide means further comprises upper sidewall members extending vertically from the tubular support portion beyond the proximal end portions of the pipette tips to protect the proximal end portions during shipping and storage.

6. The refill pack of claim 2 wherein the lower sidewall members of the positioning and guide means are contiguous with each other and the guide formed thereby comprises a vertically extending skirt having vertically extending inner guide surfaces.

7. The refill pack of claim 6 wherein the lower sidewall members extend vertically from the tubular support portion and extend slightly outwardly and downwardly to accommodate a stacking of several of the refill packs.

8. The refill pack of claim 2 wherein:
the support structure for the organizing and support means comprises a separate support plate; and
the tubular support portion of the positioning and guide means is contiguous with the lower sidewall members and extends around and horizontally and releasably supports the support plate.

9. The refill pack of claim 8 wherein the releasable means releasably secures the support plate to the tubular support portion of the positioning and guide means and upon actuation by the user releases the support plate and the array of pipette tips from the tubular support portion through the open bottom of the guide into the holes in the organizing tray when the support plate and the array of pipette tips are over the empty pipette tip rack to effect a refilling of the tip rack.

10. The refill pack of claim 2 wherein:
the support structure of the organizing and support means comprises a separate support plate, and
the hand-gripable positioning and guide means comprises:
cover means including a top and the contiguous sidewall members extending from the top and horizontally supporting the support plate to confine and protect the proximal end portions of the pipette tips, the contiguous sidewall members combining to form open bottom skirt means extending beyond the distal end portions of the pipette tips for receiving the top of the empty pipette tip rack and for guiding the cover means downward over the empty pipette tip rack with the distal end portions of the pipette tips aligned with the holes in the organizing tray of the empty pipette tip rack; and
releasable means including means on the sidewall members (i) for releasably securing the array of pipette tips relative to the cover means and (ii) for actuation by a user to release the array of pipette tips from the cover means downward through the open bottom skirt means into the holes in the organizing tray when the support plate is positioned over the empty pipette tip rack with the distal end portions of the pipette tips extending into the empty pipette tip rack to effect a refilling of the empty pipette tip rack.

11. The refill pack of claim 10 wherein the cover means and the releasable means comprise a flexible plastic cover having an inwardly flexible top over the proximal ends of the pipette tips and an open bottom defined by outwardly flexible sidewall members extending from the top to surround and releasably engage and secure the support plate within the cover, whereby an inward force on the top will inwardly flex the top to press on the proximal ends of the pipette tips and will outwardly flex the sidewall members to release the support plate and array of tips through the open bottom of the cover and into the empty pipette tip rack.

12. The refill pack of claim 10 wherein:
the top of the cover means is separate from the contiguous sidewall members which form a tubular housing having an open top and an open bottom, lower portions of the tubular housing forming the skirt for guiding the housing onto the top of the empty pipette tip rack during a reloading thereof;
the separate top extending horizontally within the open top of the housing and being manually moveable as a downward push plate within the housing to effect actuation of the releasable means and a dispensing of the array of pipette tips into the empty pipette tip rack.

13. The refill pack of claim 12 wherein the releasable means includes guide means for movement of the push plate toward the support plate to affect a release of the pipette tips from the refill pack into the empty pipette tip rack.

14. The refill pack of claim 13 wherein the releasable means is between the support plate and the sidewall members of the cover means.

15. The refill pack of claim 2 wherein:
the array of pipette tips comprises an array of horizontally spaced vertical stacks of tips, each stack containing a plurality of pipette tips with all but a lowermost one of the tips telescoping into a next lower tip in the stack and the lowermost tip in each stack extending into a hole in the support structure for support thereby;
a push plate engaging an uppermost end of the proximal end portions of the pipette tips in each of the vertical stacks and comprising the array of tips extending vertically from the support structure, the lowermost ones of pipette tips in the vertical stacks comprising the pipette tips having distal end portions extending through the holes in the support structure for extending into the organizing tray of the empty pipette tip rack when the support structure is placed there over; and
the releasable means comprises a tubular housing dimensioned to (i) receive and horizontally support the support structure in the housing with the vertical stacks of pipette tips therein and (ii) receive the push plate at an open upper end of the housing with sidewalls of the housing supporting the push plate for downward movement into the housing to affect a sequential release of lowermost pipette tips in the vertical stacks into the empty pipette tip rack.

16. The refill pack of claim 15 wherein the housing includes first stop means for securing the support structure within the housing and the support structure includes moveable means extending into the holes to define enlargable openings for receiving and holding the distal end portions of the lowermost pipette tips of the vertical stacks and for enlarging to receive and pass the proximal end portions of the lowermost pipette tips as the tips move downward in response to downward movement of the push plate for release from the refill pack into the empty pipette tip rack.

17. The refill pack of claim 16 wherein the housing includes vertically spaced detent means along opposing inner walls thereof for allowing downward movement of the push plate into the housing and for preventing upward return movement of the push plate in the housing.

18. The refill pack of claim 16 wherein the push plate carries a plurality of spaced pipette tip indexing means fitting into the proximal ends of the uppermost pipette tips in the vertical stacks containing the vertical stacks vertically aligned within the housing as the push plate is moved downwardly within the housing to successively release lowermost ones of the vertical stacks of pipette tips into the empty pipette tip rack through the enlargable openings in the support plate.

19. The refill pack of claim 15 wherein the pipette tips comprising each of the vertical stacks are substantially equally vertically spaced to define a plurality of vertically separated arrays of pipette tips and wherein the refill pack further comprises pipette tip carrier plates for carrying each vertically separated array of pipette tips, each carrier plate extending horizontally within the housing with distal end portions of the pipette tips carried thereby extending through holes in the carrier plate and with proximal end portions of the pipette tips carried thereby extending vertically above the carrier plate whereby support structure and sequentially thereafter the carrier plate carrying the lowermost ones of the pipette tips in the vertical stacks of pipette tips are successively ejected with the lowermost pipette tips from the housing upon a downward movement of the push plate within the housing.

20. For use with an empty reusable pipette tip rack including a rigid horizontally extending pipette tip organizing tray having an array of pipette tip distal end receiving holes therethrough supported above a base by vertically extending side support members, a refill pack comprising:

a container of light weight low mass material having an open end, a closed horizontally extending inwardly flexible end and contiguous, outwardly flexible sidewalls extending vertically from the closed end of the container with organizing plate support means on opposing ones of the sidewalls and lower sidewall portions below the support means forming a downwardly extending open bottom tubular skirt for guiding the container onto the tip rack with the lower sidewall portions moving along the side support members of the rack;

a plurality of pipette tips each having a proximal end portion and a relatively narrow distal end portion;

a semi-rigid organizing plate for vertically supporting and horizontally positioning the plurality of pipette tips as a horizontally spaced array within the container, the organizing plate having a plurality of openings receiving the distal end portions of the plurality of pipette tips, the organizing plate being dimensioned to extend within the container for horizontal support by the organizing and support means such that ends of the proximal end portions of the pipette tips are adjacent the closed end of the container and ends of the distal end portions of the pipette tips are above the open end of the container defined by the open bottom of the skirt whereby the proximal end portions of the pipette tips are protected by the organizing plate and the closed end and sidewalls of the container above the support means and the distal end portions of the pipette tips are protected by the skirt and whereby a guided positioning of the organizing plate by the skirt over the empty pipette tip rack aligns the distal end portions of the pipette tips with holes in the organizing tray of the empty pipette tip rack, the holes matching at least a portion of the array of openings in the organizing plate, and an inwardly flexing of the closed end of the container outwardly flexes the sidewalls to release the organizing plate through the open bottom of the skirt onto the organizing tray of the empty pipette tip rack with the distal end portions of the tips passing into the array of holes in the tray to refill the empty pipette tip rack.

21. For use with an empty pipette tip rack including a horizontally extending pipette tip organizing and support tray having an array of holes therethrough supported above a base by vertically extending side support members, a refill package comprising:

a pipette organizing and support plate of light weight semi-rigid material having an array of holes therethrough each hole in the support plate receiving a distal end portion of a pipette tip to vertically support and organize an array of pipette tips;

an array of pipette tips comprising an array of horizontally spaced vertical stacks of pipettes, each stack containing a plurality of pipette tips with all but a lowermost one of the tips telescoping into a next lower tip in the stack and the lowermost tip in each stack extending into a different hole in the support plate for support thereby with a distal end portion of the lowermost tip extending below the support plate and the proximal end portion of the lowermost tip extending above the support plate;

a tubular housing horizontally supporting the support plate adjacent a lower open end thereof to vertically confine and protect the stacks of pipette tips and at a lower end below the support plate including a skirt for centering and guiding the housing onto the empty pipette tip rack with the distal end portion of the lowermost tip in each stack aligned with a corresponding hole in the organizing tray of the tip rack to vertically seat therein upon a lowering of the housing onto the tip rack;

a horizontally extending push plate in an open upper end of the housing and supported for downward movement into the housing to engage an uppermost end of a proximal end portion of an uppermost one of the pipette tips in each of the stacks; and the support plate including moveable means extending into the holes thereof and defining enlargable openings for receiving and holding the distal end portions of the lowermost pipette tips and for enlarging to receive and pass the proximal end portions of the lowermost pipette tips in response to downward movement of the push plate into the housing to release the lowermost pipette tips from the refill pack to refill the tip rack.

22. For use with an empty pipette tip rack including a rigid horizontally extending pipette tip organizing and support tray having an array of holes therethrough for receiving and supporting distal end portions of an array of pipette tips, the tray being supported above a base by vertically extending side support members, a refill package for the tip rack, comprising:

a pipette tip organizing plate of light weight semi-rigid material having an array of holes therethrough each hole in the organizing plate receiving a distal end portion of a pipette tip to vertically support and horizontally organize an array of pipette tips;

a plurality of carrier plates of light weight semi-rigid material each having an array of holes therethrough corresponding to the array of holes in the organizing plate, each hole in each carrier plate being structured to receive a distal end portion of a pipette tip to vertically support and horizontally organize an array of pipette tips;

a plurality of arrays of pipette tips, the pipette tips in a first array having distal end portions extending vertically through the holes in the organizing plate for support thereby and proximal end portions extending above the organizing plate, the pipette tips in a second array having distal end portions extending through the holes in a lowermost one of the carrier plates resting on the proximal ends of the pipette tips in the first array supported on the organizing plate and telescoping into the distal end portions of the tips in the first array and having proximal end portions extending above the lowermost carrier plate, the pipette tips in a third array having distal end portions extending through the holes in a next lowermost one of the carrier plates resting on the proximal ends of the pipette tips in the second array supported on the lowermost carrier plate and telescoping into the distal end portions of the tips in the second array and having proximal end portions extending above the next lowermost carrier plate, and so on for each of the other arrays of pipette tips and carrier plates to define a stack of arrays of pipette tips and carrier plates;

a tubular housing for receiving the stack of arrays of pipette tips and carrier plates and including support means for releasably and horizontally supporting the organizing plate adjacent a lower open end thereof and at a lower end below the support means including a skirt for centering and guiding the housing onto the empty pipette tip rack with the distal end portions of the first array of pipette tips aligned with corresponding holes in the organizing tray of the tip rack; and a horizontally extending push plate in an open upper end of the housing and supported for downward movement into the housing to engage the proximal end portions of an uppermost one of the arrays of pipette tips, whereby the organizing plate and sequentially thereafter the carrier plate carrying a lowermost one of the arrays of pipette tips is successively ejected from the housing upon a downward movement of the push plate within the housing.

* * * * *